United States Patent Office 3,605,683
Patented Sept. 20, 1971

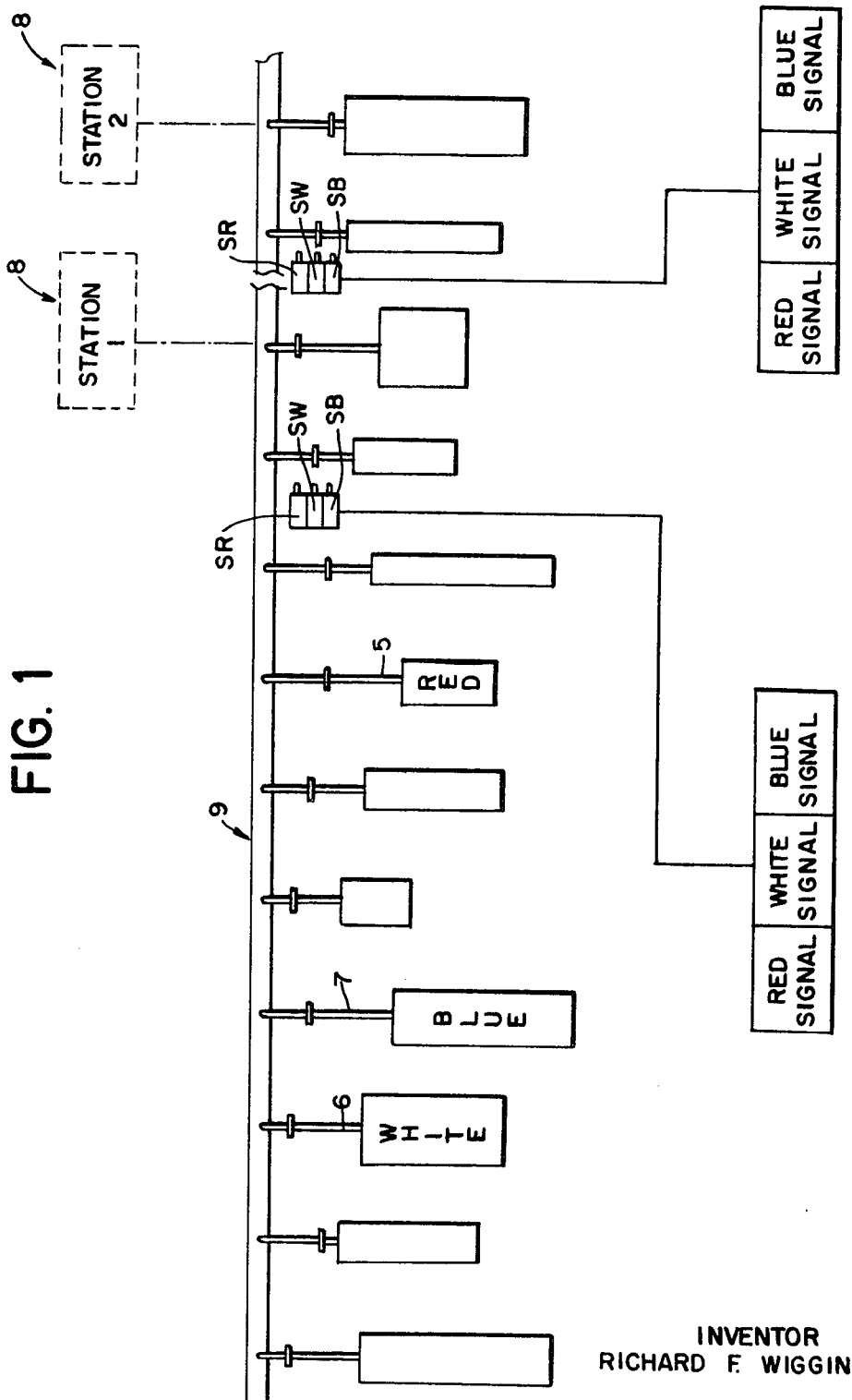

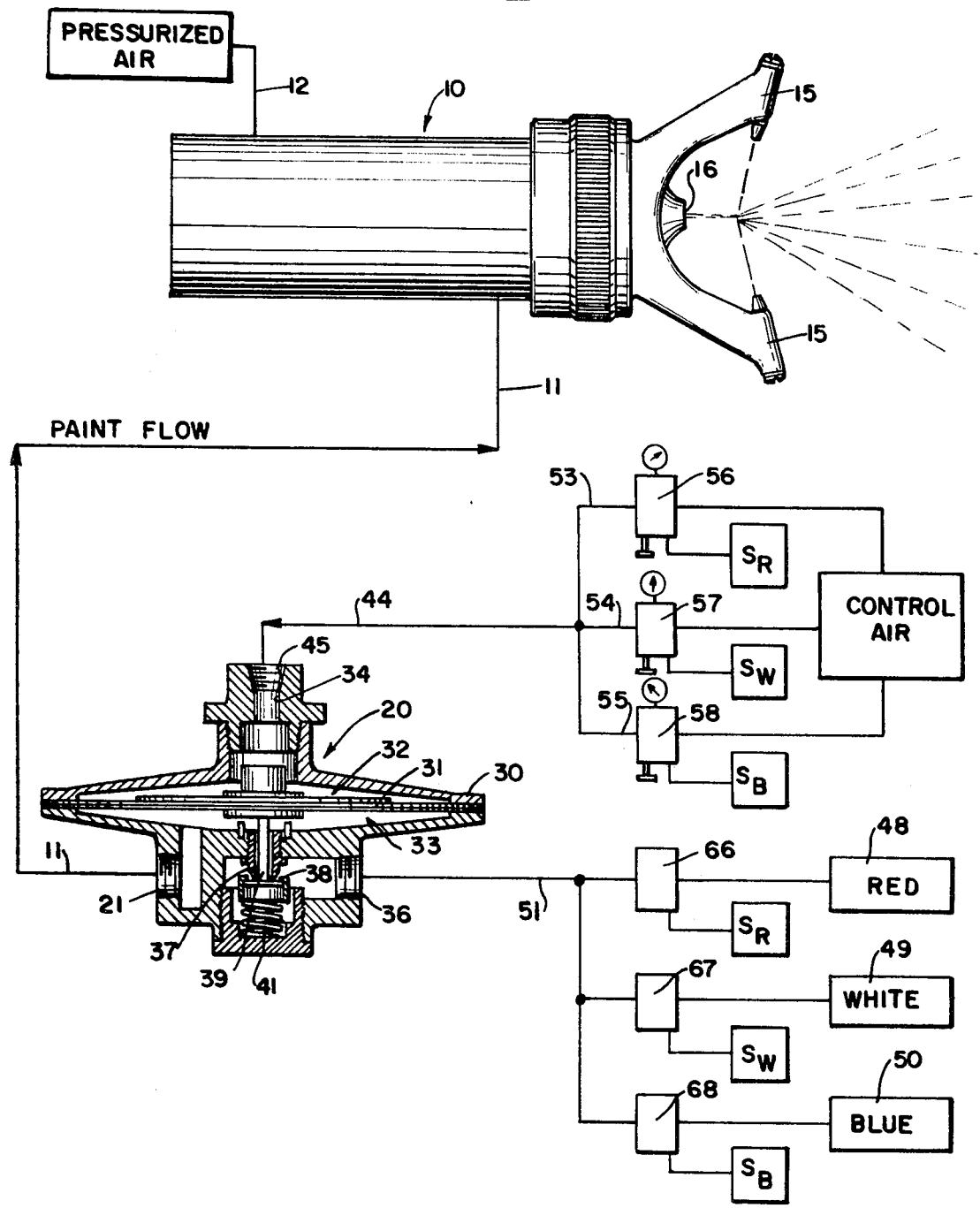

3,605,683
PAINT SPRAY SYSTEM
Richard F. Wiggins, Fairfield, Conn., assignor to The Gyromat Corporation, Stratford, Conn.
Filed Apr. 3, 1969, Ser. No. 813,083
Int. Cl. B05c 5/00, 11/00
U.S. Cl. 118—8
4 Claims

ABSTRACT OF THE DISCLOSURE

The disclosure relates to a system for delivering a spray coating material, such as paint, to spray guns at any one of several fixed rates controlled by predetermined pressures, which predetermined pressures are selected for optimum coating performance of a specific spray coating material on a specific article. The spray rates of each of the guns at a spray station on a coating line processing a variety of articles with a variety of coatings is controlled by a paint regulator at the gun, which paint regulator is itself remotely controlled by a selected one of several preset pressure regulators associated therewith. The pressure of each of the remotely located, individual pressure regulators is fixed in advance for optimum performance of the gun with a specific type or color coating material and/or with a specific coating condition determined by the shapes and sizes of the articles.

BACKGROUND OF THE INVENTION

Heretofore, in the operation of conveyorized spray coating lines, each of the spray gun stations (having one or more guns) on the line has had a single pressure regulator associated therewith for controlling the paint regulator at or near the respective gun or guns of that station, which paint regulator regulates the pressure and hence the rate at which the spray coating material is delivered to the fluid orifice of each spray gun. Accordingly, when the type or color of the coating material being sprayed is changed during the operation of the line, thereby varying the coat weight requirements, or when the size and/or shape of article being sprayed is changed during the operation of the line, thereby varying the gun-to-sprayed surface distance or the stroke of a reciprocated gun, it often has been necessary for an operator to make an appropriate adjustment of the pressure regulator for each gun station to compensate for the change required in the paint regulator at the gun or guns. Needless to say, this type of manual adjustment is highly time consuming, less than fully efficient, and may introduce imprecise pressure regulation. Thus, when a conveyorized coating line has numerous stations, as is usually the case, and the line is handling a multiplicity of different sized and shaped parts which are to be painted with different colors, for example, an operator will not have enough time to properly make all of the requisite compensatory pressure changes to insure an optimum spray rate at each gun of the many stations.

SUMMARY OF THE INVENTION

In accordance with the principles of the invention, the foregoing shortcomings of conventional conveyorized coating lines are eliminated by arranging for control of the pressure of spray coating material delivery to each gun (or spray rate) at each station through preset pressure regulation, i.e., plural preset regulators for each paint regulator for each gun, one of which pressure regulators is selectively operated at a time. The selection of the appropriate pressure regulator to be employed for given painting conditions and to control the single paint regulator, is remotely controlled advantageously by solenoid actuation. The selection of the proper pressure regulator may be fully automated by coupling the control solenoids for each of the preset pressure regulators with appropriate sensors on the conveyor line, or by coupling the solenoids with an appropriate programmed controlling device such as an electronic computer or other automatic electromechanical paint selection systems.

Regardless of the specific degree of automation chosen for controlling the selection for actuation of an individual preset pressure regulator from the plural preset regulators, the efficiency of operation and the reliability of the performance of conventional spray guns will be significantly enhanced by adoption of the method and apparatus of the invention.

For a more complete understanding of the present invention, reference may be had to the following detailed description taken in conjunction with the accompanying drawings.

DESCRIPTION OF THE DRAWINGS

FIG. 1 is a schematic representation of a conveyorized paint spray line having plural coating stations and embodying the apparatus of the present invention; and FIG. 2 is a schematic representation of a spray gun at an individual station controlled through plural preset pressure regulators.

DESCRIPTION OF PREFERRED EMBODIMENT

Referring now to FIGS. 1 and 2, the system of the invention includes a plurality of paint spray stations 8 of the type commonly used on a conveyorized industrial coating line 9. Each station 8 includes a pair of spray guns 10 (only one of which is shown in FIG. 2) supplied with paint or like coating material through a paint delivery tube 11 and with pressurized atomizing air through an air supply tube 12. Commonly, the guns are mechanically reciprocated and also include suitable electrostatic charging apparatus to provide the issuing spray particles with an appropriate electric charge. However, since the specific details of construction of such reciprocators, chargers, and spray guns are well known, they have not been described at length herein. Nevertheless, a comprehensive description of typical guns and reciprocators, which may be used to advantage in the practice of the invention, may be obtained from United States Patent No. 3,219,276, issued to E. O. Norris, on Nov. 23, 1965, and from United States Patent No. 3,348,774, issued to R. F. Wiggins, on Oct. 24, 1967. The disclosures of these patents are considered to be incorporated by reference herein.

As indicated in FIG. 2, each spray gun 10 is advantageously of a type having a central paint nozzle or fluid orifice 16 and reentrant fan shaping air jets 15. The nozzle 16 is appropriately supplied with paint and atomizing air by supply tubes 11, 12, while the air jets 15 are supplied independently. The paint supply tube 11 is connected to the outlet 21 of a paint regulator 20, which is of the type commonly used for regulating the precise pressure under which spray material is delivered to the nozzle 16. This paint regulator 20 comprises a housing 30 carrying a diaphragm 31 dividing the housing 30 into an air chamber 32 and a material chamber 33. A bleeder hole 34 in the housing 30 communicates with the chamber 32 to effect regulation. Spray material is supplied to the chamber 33 through an inlet opening 36 in the housing. A valve seat 37, adapted to be closed by a valve head 38, is carried by a stem 39 which is attached to the diaphragm 31 for movement therewith. A spring 41 biases the head 38 toward the seat 37.

Spray material is discharged from the chamber 33 through an outlet opening 21 and into the tube 11. Air is supplied to the chamber 32 by a tube 44 through a port 45. The arrangement is such that an increased air pressure in the chamber 32 tends to open the valve 38 to cause the pressure of the material in the chamber 33 to build up until the air pressure is balanced by the pressure of the material in the latter chamber. Hence, the pressure of the material fed to the nozzle 16 is varied by a corresponding variation in the air pressure in the air chamber 32.

Referring to the system shown in FIG. 2, the material to be sprayed is delivered under pressure from a selected one of the material tanks 48, 49, 50 through a paint valve 66, 67, or 68 through a tube 51 to the paint chamber 33 of the paint regulator 20. The selected material is then delivered by tube 11 to the nozzles 16 of each spray gun at a specific pressure determined by the pressure in the air chamber 32 of the paint regulator 20.

In accordance with the invention, air under any one of several different pressures, each predetermined for a specific coating condition, is supplied to the air chamber 32 of the paint regulator 20 through a selected one of the plural lines 53, 54, 55, each of which includes an independent, pre-set pressure regulator 56, 57, 58. For example, where differences in color of the spray material dictate differences in coat weights, pressure regulator 56 may be set to control the paint regulator 20 so as to deliver a greater coat weight of paint to an article than would be the case when the paint regulator 20 is under the control of the setting of pressure regulator 57. Likewise, when one type article (thin panel) is conveyed at a greater distance from the spray nozzles 16 than another type article (bulky object), or if the stroke of a reciprocating gun is changed to compensate for changes in length of conveyed articles, proper and uniform coating of both articles often will require that each be coated by a spray supplied to the gun 10 under a different pressure.

A conveyorized coating line embodying the principles of the invention may be operated as follows: Articles to be sprayed are loaded on the conveyor line with hangers 5, 6, or 7 coded in accordance with the spray condition required. For example, a differently coded hanger is provided for articles to be painted red, white, or blue, and each coded hanger will actuate only one of the control solenoids SR, SW, SB (hanger 5 actuate solenoid SR for red, hanger 6 actuates solenoid SW for white, hanger 7 actuates solenoid SB for blue), which selected solenoid will generate an appropriate control signal R, W, or B which controls certain of the parameters at the inlet side of the paint regulator 20 which is associated with the spray gun 10. More specifically, the generated control signal will selectively actuate one of the preset pressure regulators 56–58 and one of the valves 66–68 to supply the required color through the paint regulator 20 under the required pressure head for that color.

Where consecutive parts on the conveyor are to be painted different colors, the gun 10 and its associated supply lines, etc., should be purged. Advantageously, the color-change control system disclosed in the aforementioned U.S. Pat. 3,348,774 may be used in association with the pressure control system disclosed herein.

It should be understood that the system of the invention has been briefly disclosed, for the purposes of example only, in a simple color-change system. The selection of one of plural preset pressure heads may be used for spraying differently shaped or sized parts with the same color. Moreover, more sophisticated or computerized control of the plural preset regulators may be employed in lieu of the "coded hanger-solenoid" control.

Regardless of the particular type of automated, remote control selected (computer, solenoid, etc.) and regardless of the type of spray application requiring pressure regulation (color change, shape change, size change, etc.), it should be understood that the important feature of the new and improved system is the provision of multiple, preset or preregulated pressure controls for the single paint pressure or spray rate regulation for each spray gun of the multiple spray stations. Therefore, many variations of the disclosed system within the spirit and scope of the invention will suggest themselves to those skilled in the art, and the invention should not be limited other than as set forth in the appended claims.

I claim:
1. A system for sequentially coating a series of articles with coating materials supplied to an atomizing nozzle under one of plural predetermined delivery pressures, which plural pressures are related to the article size, article shape, and/or the characteristics of applied coating material, which system comprises
   (a) a spray gun means having a material outlet which is adapted to issue a spray of coating material therefrom;
   (b) coating material supply line means adapted to interconnect at least one source of coating material with said spray gun means;
   (c) a paint regulator means in proximate association with said spray gun means and interposed in said supply line means to control the specific pressure under which said coating material is delivered to said material outlet of said spray gun means;
   (d) said paint regulator itself being adapted for control through a remote pressure regulator;
   (e) a plurality of selectively actuatable pressure regulators associated with said paint regulator and located remotely of said spray gun means;
   (f) said pressure regulators providing predetermined different control pressure to said paint regulator whereby said paint regulator delivers coating material to said gun means under a predetermined pressure remotely controlled by the selected one of said plural pressure regulators;
   (g) control means associated with said plural pressure regulators adapted to activate one of said pressure regulators exclusively of the others in response to a control signal;
   (h) signal generating means for generating a control signal correlated to a predetermined physical characteristic of each of said articles;
   (i) sensor means associated with said articles for sensing and communicating said predetermined physical characteristic to said signal generating means.
2. The system of claim 1, in which
   (a) said spray gun means includes an air atomizing spray head.
3. The system of claim 1, which further includes
   (a) conveyor means for transporting said series of articles past said spray gun means.
4. The system of claim 1 wherein
   (a) said control means include a selectively actuatable solenoid associated with each pressure regulator.

References Cited

UNITED STATES PATENTS

| | | | |
|---|---|---|---|
| 3,348,774 | 10/1967 | Wiggins. | |
| 3,444,839 | 5/1969 | Ellul | 118—2 |
| 3,450,092 | 6/1969 | Kock | 118—2 |

JOHN P. McINTOSH, Primary Examiner

U.S. Cl. X.R.

118—324